June 18, 1968   J. W. WILKINSON   3,388,802
FILTER ELEMENT SUPPORT MEANS
Filed Oct. 21, 1965   4 Sheets-Sheet 1
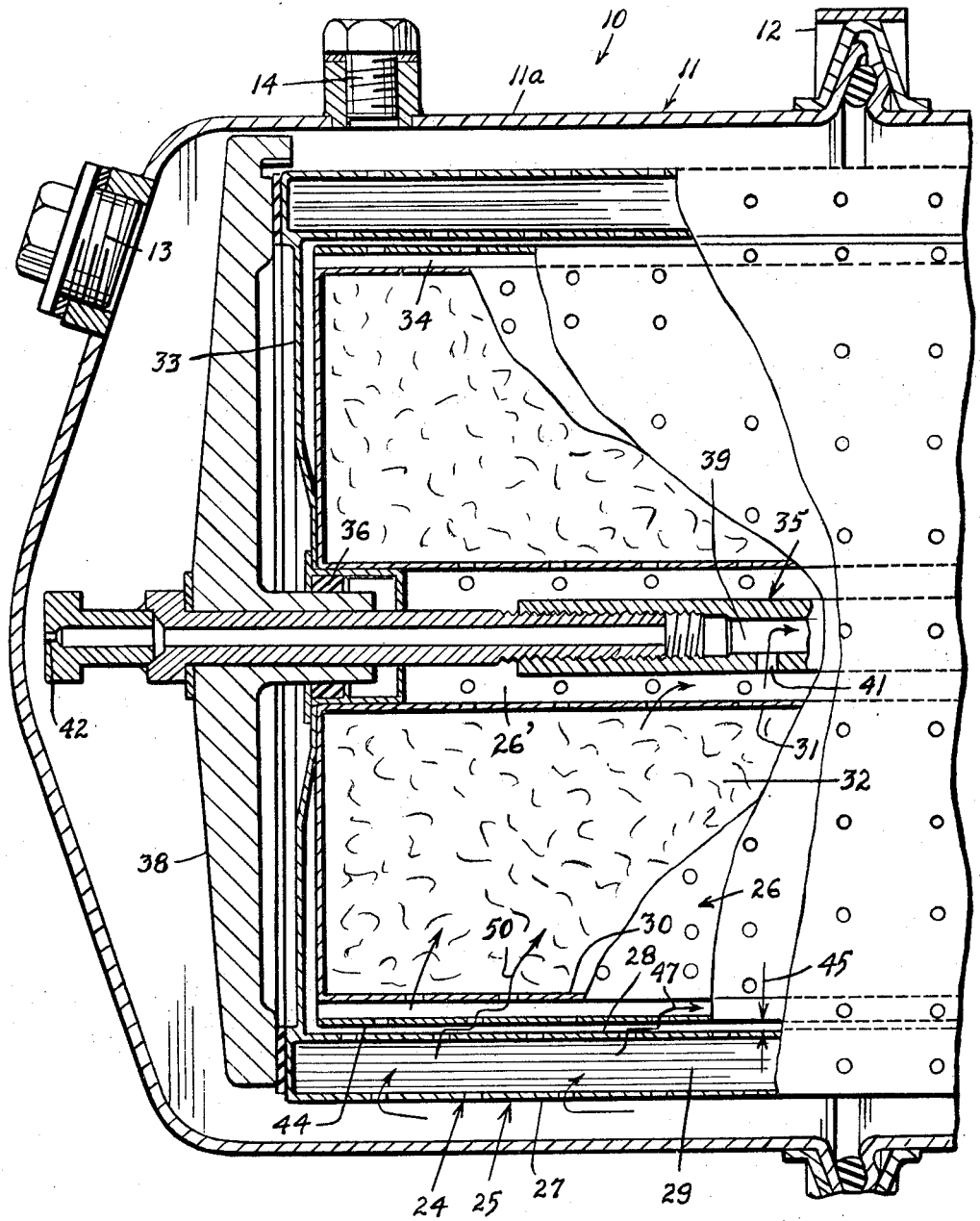
FIG-IA
INVENTOR
JAMES W. WILKINSON
BY *Munson H. Lane*
ATTORNEY

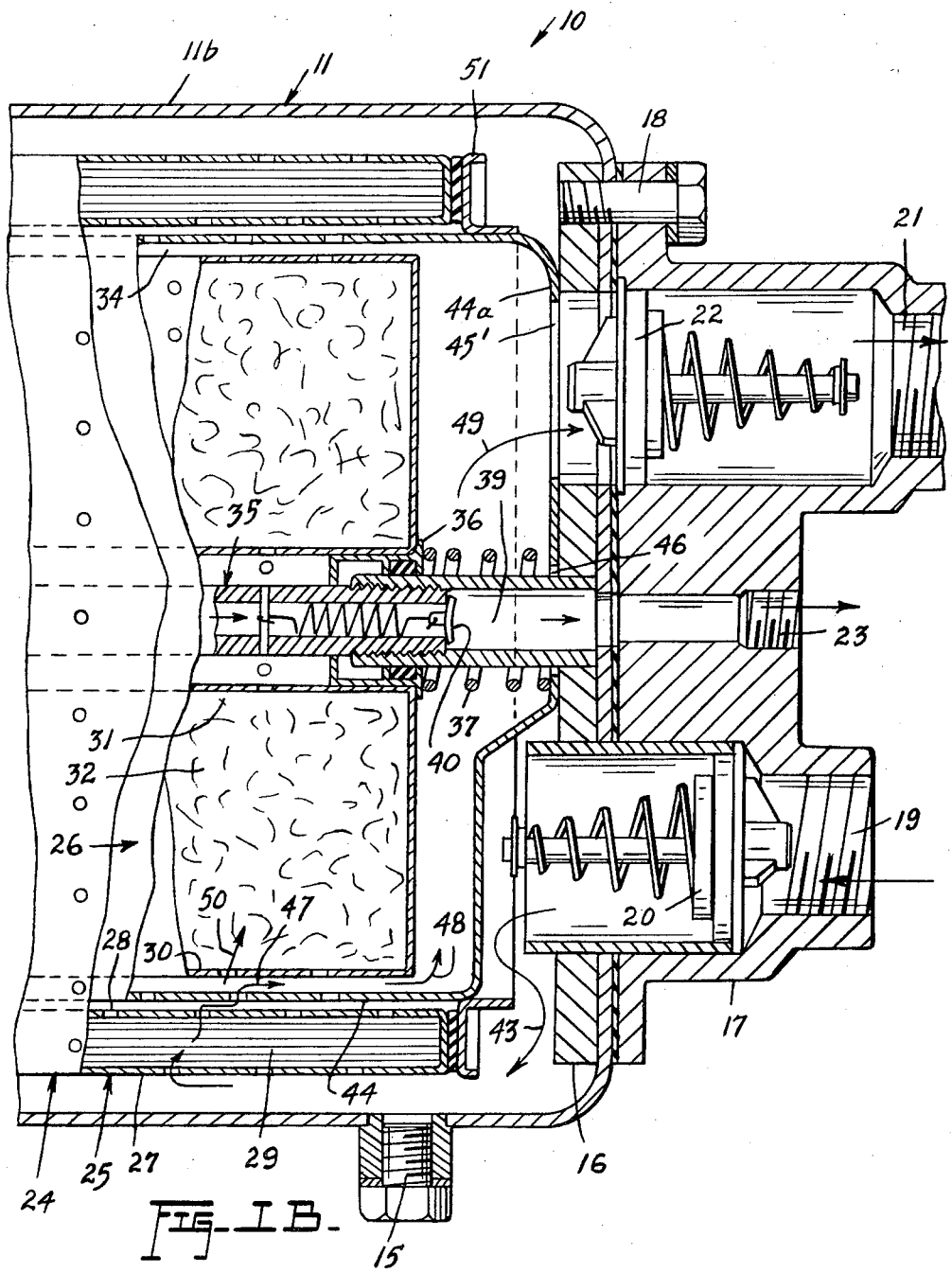

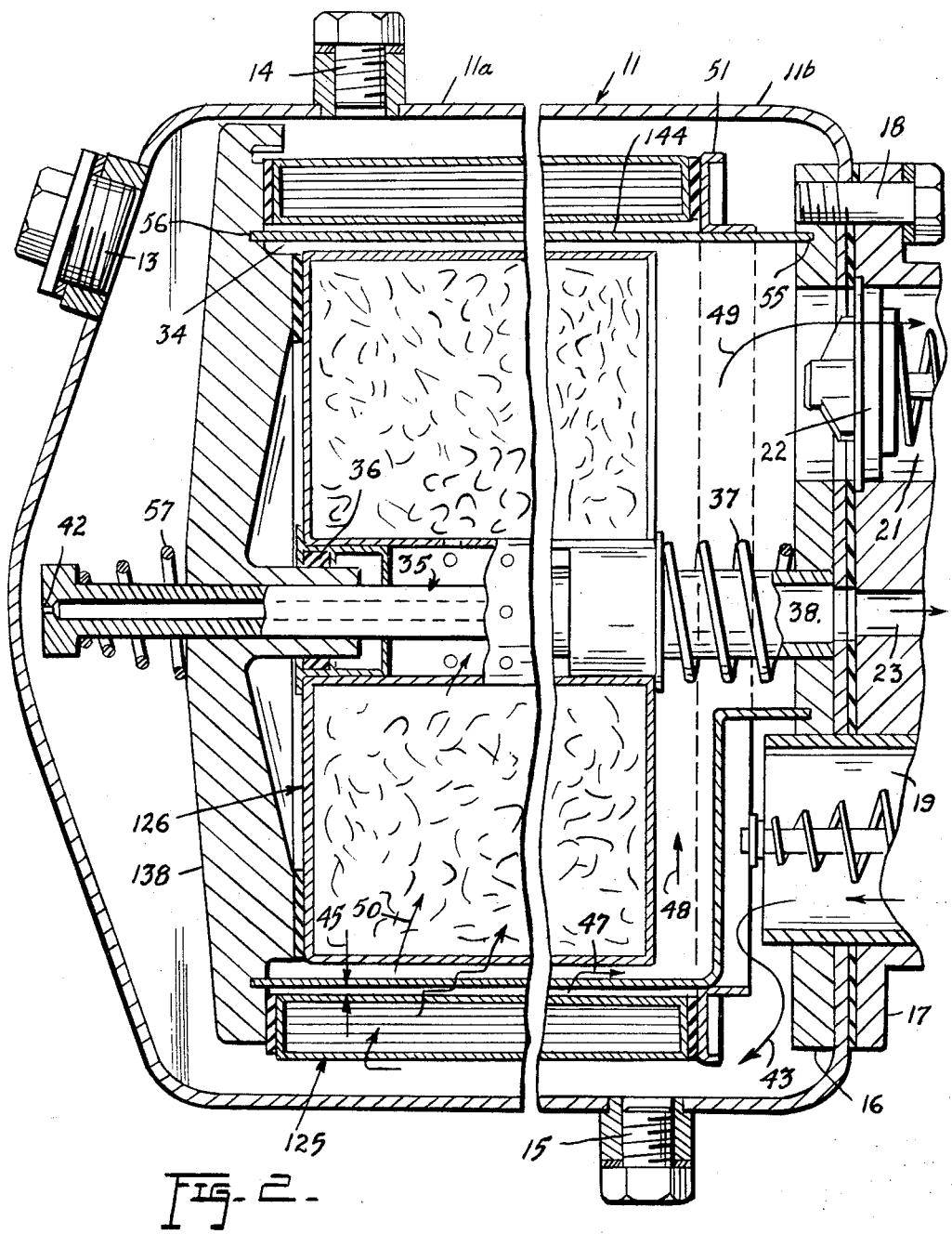

June 18, 1968   J. W. WILKINSON   3,388,802
FILTER ELEMENT SUPPORT MEANS

Filed Oct. 21, 1965   4 Sheets-Sheet 4

INVENTOR
JAMES W. WILKINSON

BY *Munson H. Lane*

ATTORNEY

United States Patent Office 3,388,802
Patented June 18, 1968

3,388,802
FILTER ELEMENT SUPPORT MEANS
James W. Wilkinson, Hastings, Mich., assignor to Hastings Manufacturing Company, Hastings, Mich., a corporation of Michigan
Filed Oct. 21, 1965, Ser. No. 499,243
18 Claims. (Cl. 210—315)

ABSTRACT OF THE DISCLOSURE

A filter assembly comprising a housing having one or more removable filter cartridges therein, the one or more cartridges having foraminous inner and outer walls with a filtering medium therebetween, the housing further having a foraminous tubular support member mounted therein in closely spaced relation to a cartridge inner wall and in independent relation to the one or more filter cartridges.

---

This invention relates to new and useful improvements in filters for liquids, and in particular the invention concerns itself with oil filters used in the lubricating systems of internal combustion engines.

Such oil filters usually comprise a housing containing a replaceable filter cartridge which has foraminous concentric walls with a porous filtering medium therebetween. Oil is delivered under pump pressure into the housing, as for example, to the outer foraminous wall of the cartridge, and after passing inwardly through the filtering medium and through the inner foraminous wall of the cartridge the filtered oil eventually leaves the housing on its way to the bearings and crankcase of the engine.

It will be appreciated that the filtering medium, although porous, offers some resistance to oil flow therethrough so that a pressure drop exists thereacross. In other words, in the above given example, the oil pressure at the outer cartridge wall of the filtering medium is greater than at the inner cartridge wall, and it will be further recognized that this pressure differential becomes more and more pronounced as the filtering medium becomes coated by solids filtered out of the oil and therefore is less than normally porous. This build up of pressure on the filtering medium causes the latter to exert progressively greater inward force on the inner wall of the cartridge where internal pressure is relatively low and eventually the great external pressure, which in some instances may exceed 120 p.s.i., may cause the inner cartridge wall to collapse.

In an effort to safeguard against such collapsing, the inner wall of the cartridge could be made sufficiently thick and strong to withstand the pressure, but as a practical matter it would not be economically feasible to employ such strong and durable construction in a disposable cartridge.

It is, therefore, the principal object of the invention to provide a safeguard against collapsing of the cartridge which exists as a permanent component of the filter housing and dependably performs its intended function without in any way adding to the structure or affecting the cost of the disposable cartridge itself. As such, the invention involves the provision of a foraminous, substantially tubular support member in the filter housing, disposed in closely spaced relation to the cartridge wall to be protected so that while permitting oil flow, the close proximity of the support member to the cartridge wall affords the desired safeguard against collapsing of that wall by built up oil pressure across the filtering medium.

The support member of the invention is adaptable for use in housings of filters of the straight full-flow type as well as those which combine full-flow and partial-flow through different cartridge members, and in all instances the arrangement of the support member as a component of the filter housing is such that it does not in any way interfere with oil flow or with convenient replacement of the cartridge or cartridges.

Other objects, features and advantages of the invention will become apparent from the following description taken in conjunction with the accompanying drawings, wherein like characters of reference are used to designate like parts, and wherein:

FIGURE 1A is a fragmentary, longitudinal sectional view showing one end portion of a filter in accordance with the invention;

FIGURE 1B is a fragmentary, longitudinal sectional view showing the other end portion thereof;

FIGURE 2 is a fragmentary, longitudinal sectional view of a modified embodiment.

Figure 3:
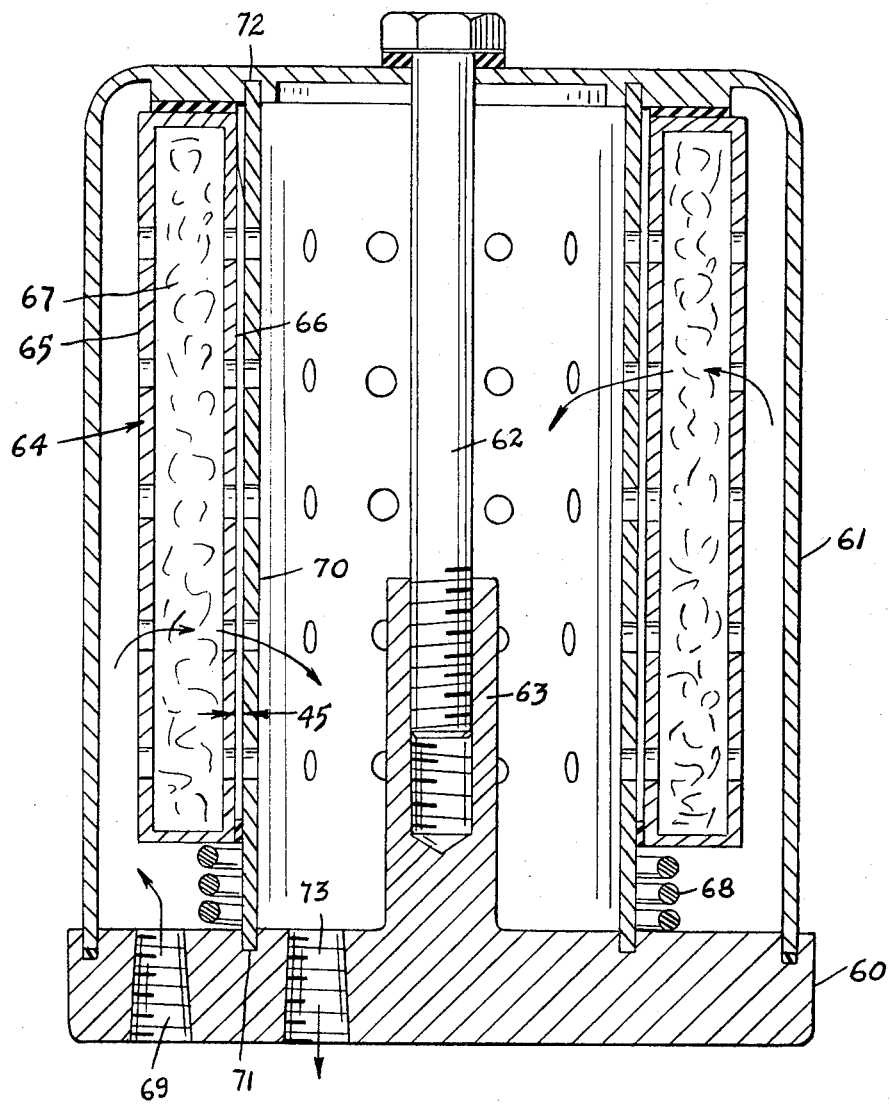
FIGURE 3 is a longitudinal sectional view of another modified embodiment.

Referring now to the accompanying drawings in detail, and more particularly to FIGS. 1A and 1B thereof, the oil filter assembly designated generally by the reference numeral 10 is of the combined full-flow and partial-flow type in which most of the oil passes through a full-flow cartridge member on its way to engine bearings and eventually to the engine crankcase, while some of the oil passes through a partial-flow cartridge member directly to the crankcase, the arrangement being that the full-flow cartridge member filters out solids which are injurious to the bearings while the partial-flow cartridge member filters out impalpable solids which are capable of passing through the bearings but discolor the oil. Conveniently, the two cartridge members form parts of a single cartridge means which may be replaced as a unit.

The filter assembly 10 ordinarily comprises a suitable housing 11 composed of two complemental sections 11a, 11b which are separably held assembled by conventional clamping ring means 12. As is customary, the housing is provided with a filler plug 13, a filler or vent plug 14 and a drain plug 15. The end of the housing section 11b is sandwiched between an internal base plate 16 and a base body 17, held assembled by suitable screws one of which is shown at 18. The base body 17 has an oil inlet 19 equipped with a suitable inlet check valve 20, an oil outlet 21 equipped with an outlet check valve 22, and a by-pass oil outlet 23, it being understood that the outlet 21 is a full-flow outlet which leads to the engine bearings and eventually to the engine crankcase, while the by-pass outlet 23 is a partial-flow outlet which leads directly to the crankcase.

The cartridge means 24 is a unitarily replaceable entity consisting of a pair of cartridge members disposed in spaced concentric relation, namely, an outer, full-flow cartridge member 25 and an inner, partial-flow cartridge member 26. For convenience of illustration, flanges, seams and other details of construction of these cartridge members have not been shown in the drawings, although it will be observed that the outer cartridge member 25 includes foraminous outer and inner walls 27, 28, respectively, with a filtering medium 29 disposed therebetween. The filtering medium 29 may be of any suitable conventional type, as for example, suitably impregnated pleated paper which is well known in the art. Similarly, the inner cartridge member 26 includes foraminous outer and inner walls 30, 31, respectively, with a filtering medium 32 of suitable open-fibrous material such as cotton linters, or the like, as is also well known. The two cartridge members 25, 26 are permanently secured together by a cartridge end plate 33 (see FIG. 1A) which bridges the annular, concentric space 34 existing between the outer wall 30 of the inner cartridge member 26 and the inner wall 28 of the outer member 25. The connection of the cartridge members 25, 26 by the plate 33 permits both members of the disposable cartridge to be installed and removed as a unit. It is significant to note, however, that in accordance with the invention the cartridge members 25, 26 are united by the plate 33 at one end of the cartridge means only, that is, at the end shown in FIG. 1A, while the relatively opposite end of the cartridge means shown in FIG. 1B is devoid of the uniting plate so that an entrance is provided into the space 34. A center post 35 of hollow, more-or-less conventional construction is provided in the housing 11 and extends centrally through the inner cartridge member 26, concentrically inside the inner wall 31 thereof, as will be readily apparent. A pair of adapter units 36 of conventional construction are provided in the ends of the inner cartridge member 26 as a component thereof and serve to slidably mount the entire cartridge means 25 on the center post 35 under the bias of a compression spring 37. The latter is positioned on the center post between the base plate 16 and the adjacent end of the cartridge means, more specifically of the cartridge member 26, thus serving to urge the cartridge means away from the plate 16 so that the outer cartridge member 25 at the relatively opposite end of the cartridge means bears against a cover 38 (see FIG. 1A) positioned on the center post 35.

The hollow center post 35 provides a central passage 39, one end portion of which is equipped with an outlet check valve 40 and communicates with the aforementioned by-pass outlet 23 in the base body 17, as will be apparent from FIG. 1B. The other end portion of the passage 39 communicates through the medium of a restricted orifice 41 in the post with the interior 26′ of the inner cartridge member 26. As shown in FIG. 1A, the end of the post 35 at the cover 38 may be equipped with a restricted orifice 42 communicating the post passage 39 with the interior of the filter housing.

It will be apparent that in the filter construction described, the oil flow is from the outside toward the inside of the filter cartridge, the oil entering the inlet 19 passing through the check valve 20 and flowing as indicated at 43 to the outside of the cartridge means 24 and entering through the outside foraminous wall 27 of the outer cartridge member 25 into the filtering medium 29 and then passing inwardly through the foraminous inner wall 28 of the outside cartridge member.

As already stated, the outside cartridge member 25 is a full-flow cartridge member which serves primarily to filter out solids such as might be injurious to engine bearings and which handles all the oil present in the engine lubricating system. The filtering medium 29 of the outside cartridge member 25 necessarily offers some resistance to the flow of oil therethrough, with the result that pressure of oil acting on the filtering medium through the outer wall 27 of the cartridge member is considerably greater than that present at the inside wall 28, particularly when after some use the filtering medium 29 becomes coated with solid deposits so that it is less than normally porous. Under such circumstances the relatively greater external oil pressure acting on the filtering medium 29 tends to press the same inwardly against the inner wall 28 so that collapsing of the inner wall 28 can occur.

To eliminate this possibility, the invention provides a foraminous, substantially tubular support member 44 which extends concentrically and axially in the annular space 34 between the inner and outer cartridge members 26, 25 for substantially the entire length of the cartridge means. The support member 44 constitutes a component of the filter housing independent of the cartridge means rather than a component of the cartridge means, and its positioning in the space 34 is such that it is relatively close to the inner wall 28 of the outer cartridge member 25. This close spacing, shown at 45 in FIG. 1A has been exaggerated for illustrative purposes, but in actual practice the space may be on the order of somewhere between .020″ and .035″. It will be appreciated that such close spacing permits oil to flow from the outer cartridge member 25 through the foraminous support member 44 to the inner cartridge member 26, yet the support member 44 is sufficiently close to the wall 28 of the outer cartridge member to prevent that wall from collapsing under inward oil pressure acting on the filtering medium 29.

As shown in FIG. 1A, the end of the support member 44 adjacent the cover 38 is unsupported or unmounted, but the other end thereof shown in FIG. 1B projects axially outwardly from the space 34 and has an end wall 44a which, for all practical purposes, may be permanently secured to the filter housing, as for example, by being bolted or welded to the base plate 16, so that the support member 44 always remains secured to the housing section 11b even when the housing sections 11a, 11b are separated for cartridge replacement purposes. The end wall 44a of the support member 44 isolates the interior of the support member from the oil inlet 19 into the housing, but is provided with a suitable opening 45′ to communicate with the oil outlet 21 as well as with an opening 46 to accommodate the center post 35.

In operation, oil to be filtered enters the housing 11 through the inlet 19, passing as at 43 to the outside of the cartridge means 24 where it flows through the outer foraminous wall 27 of the outer cartridge member 25 and through the filtering medium 29 of the full-flow outer cartridge member. After passing through the filtering medium 29 and through the foraminous inner wall 28 of the outer cartridge member 25, the oil flows to the interior of the foraminous support member 44 in the annular space 34, as indicated at 47 in FIG. 1B. Here the flow is divided, with most of the oil passing as at 48 and 49 and through the full-flow outlet 21 to the engine bearings and ultimately to the crankcase, while some of the oil enters as at 50 through the foraminous wall 30 of the inner cartridge member 26. There this partial-flow passes through the filtering medium 32 and through the foraminous wall 31 to the interior 26′ of the inner cartridge member, and then through the restricted orifice 41 into the passage 39 in the center post 35 and through the oil outlet 23 directly to the crankcase of the engine, while by-passing the engine bearings.

As already stated, the significant point is that the foraminous support member 44, disposed in close relation to and at the inside of the inner wall 28 of the outer cartridge member 25, effectively prevents the wall 28 from collapsing under excessive external oil pressures acting on the filtering medium 29. Yet, this is facilitated without strengthening the disposable cartridge itself, since the support member 44 is a component of the filter housing and independent of the cartridge means. By the same token, the cartridge means 24 may be conveniently replaced as a unit, without any interference from the support member.

In concluding the description of the embodiment of FIGS. 1A and 1B, it will be noted that, as shown in FIG. 1B, the base portion of the support member 44 is provided with an annular, external flange 51 which serves as a seat for the adjacent end of the outer cartridge member 25, the relatively opposite end of which bears against the aforementioned cover 38 as shown in FIG. 1A.

Reference is now drawn to FIG. 2 which shows a modified embodiment of the filter shown in FIGS. 1A and 1B. To a large extent the same or closely similar parts are involved, so to that extent the same reference numerals are applicable. However, two principal differences exist, one being that the foraminous cartridge supporting member 144 is removably mounted rather than permanently fixed in the filter housing. At the base end of the filter, this may be effected by simply inserting the end of the support member into an annular groove 55 formed in the base plate 16. If desired, this same arrangement may also be used in the embodiment of FIGS. 1A and 1B, in place of welding or bolting the support member to the base plate, it being apparent that such an arrangement would be possible in FIGS. 1A and 1B inasmuch as the support member is mounted by its base end only and its other, opposite end is without mounting means.

As the second important difference between the embodiments of FIGS. 1A, 1B and FIG. 2, the cartridge means in FIG. 2 are two separate entities, namely, an outer full-flow cartridge member 125 and an inner partial-flow cartridge member 126, the two members being devoid of the connecting plate such as exists at 33 in FIG. 1A. As a result, at that end of the cartridge means the support member 144 may also project axially from the space 34 for seating in an annular groove 56 formed in the cover 138, so that the support member 144 is mounted at both of its ends, instead of at one end only. A compression spring 57 may be provided on the center post 35 in abutment with the cover 138 so as to urge the cover into retaining engagement with both cartridge members 125, 126, it being understood that the cartridge member 125 is seated against the flange 51 on the support member 144 and that the inner cartridge member 126 is also biased toward the cover 138 by the spring 57.

In any event, the arrangement is such that when the filter housing is opened up and the cover 138 removed, both cartridge members 125 and 126 may be replaced and the support member 144 may also be removed for purposes of cleaning, or the like. Otherwise, the operation of the embodiment of FIG. 2 is the same as that of the embodiment of FIGS. 1A, 1B.

FIGURE 3 illustrates a further modified embodiment wherein the principles of the invention are adapted in a straight full-flow filter rather than in one which combines full-flow and partial-flow. Here, the filter housing may conveniently consist of a base portion 60 and a removable top portion or cover 61, held in place by a clamping bolt 62 extending into a screw-threaded center post 63 of the base portion 60. The housing contains a replaceable full-flow cartridge 64 with outer and inner foraminous walls 65, 66 and a filtering medium 67 therebetween. The cartridge 64 is biased against the top of the housing portion 61 by a compression spring 68, arranged in any suitable manner. It will be understood that FIG. 3 is largely diagrammatic and thus omits many conventional details of construction which are well known in the art, the primary purpose of FIG. 3 being to show the principles of the invention embodied in a straight full-flow filter of this general type.

The base portion 60 has an inlet 69 for delivering oil under pressure to the outer wall 65 of the cartridge 64, such oil passing through the foraminous outer wall 65 and through the filtering medium 67 to the inside of the cartridge through the foraminous inner wall 66. Here again, the invention provides a foraminous, substantially tubular support member 70 which extends axially through the cartridge and is suitably mounted in the filter housing, as for example, by having its ends inserted in suitable seats 71, 72 formed in the housing portions 60, 61. The foraminous support member 70 is disposed in closely spaced relation as at 45 to the inside of the inner cartridge wall 66 to prevent collapsing of that wall by oil pressure acting on the filter medium 67. The filtered oil is discharged from the interior of the support member 70 through an outlet 73 in the housing portion 60.

It may be noted that in the embodiments of the invention shown and described, the oil flow is from the outside toward the inside of the filter cartridge, so that the cartridge supporting tube of the invention is appropriately located at the inside of the cartridge wall which is to be protected against collapsing. However, in filters utilizing oil flow in the opposite direction, that is, from the inside to the outside of the cartridge, the supporting tube would, of course, be located at the outside of the protected cartridge wall.

Thus, while in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a liquid filter, the combination of a housing, a replaceable cartridge removably positioned in said housing, said cartridge including foraminous inner and outer walls and a porous filtering medium therebetween, said housing having an inlet for delivering pressurized liquid to the outer foraminous wall of said cartridge, an apertured hollow center post extending axially through the housing and carried thereby, and having a liquid outlet communicating with the exterior of the housing, and a foraminous substantially tubular support member provided in the housing as a component thereof independent of said cartridge, said support member extending centrally in said cartridge externally of said apertured post and in closely spaced relation to the inner cartridge wall to prevent collapsing of the latter by inward liquid pressure on said filtering medium when the filtering medium becomes less than normally porous, said housing also being provided with a liquid outlet in communication with the interior of said support member and offset laterally with reference to the center post.

2. The device as defined in claim 1 wherein said support member is permanently fixed in said housing.

3. The device as defined in claim 1 wherein said support member is removably positioned in said housing.

4. The device as defined in claim 1 wherein said support member is mounted by both ends thereof in said housing.

5. The device as defined in claim 1 wherein said support member is mounted by only one end thereof in said housing.

6. In a liquid filter, the combination of a housing including a pair of complemental housing sections separably assembled, a replaceable cartridge removably positioned in said housing, said cartridge including foraminous inner and outer walls and a porous filtering medium therebetween, said housing having an inlet for delivering pressurized liquid to the outer foraminous wall of said cartridge, an apertured hollow center post extending axially through the housing and carried thereby, and having a liquid outlet communicating with the exterior of the housing, and a foraminous substantially tubular support member provided in said housing as a component thereof independent of said cartridge, said housing sections being provided with seats having the ends of said support member seated therein with at least one end of the support member being removable from its seat, said support member extending centrally through said cartridge externally of the apertured post and in closely spaced relation to the inner cartridge wall to prevent collapsing of the latter by inward liquid pressure on said filtering medium when the filtering medium becomes less than normally porous, said housing also being provided with a liquid outlet in communication with the interior of said support member and offset laterally with reference to the center post.

7. In a liquid filter, the combination of a housing, replaceable cartridge means removably positioned in said housing and including inner and outer cartridge members disposed in spaced concentric relation, each of said cartridge members including foraminous inner and outer walls and porous filtering medium therebetween, said housing having an inlet for delivering pressurized liquid to the outer foraminous wall of the outer cartridge member, an apertured hollow center post extending axially through the housing and carried thereby, and having a liquid outlet communicating with the exterior of the housing and a foraminous substantially tubular support member provided in said housing as a component thereof indepedent of said cartridge means, said support member extending concentrically and axially in the space between the inner and outer cartridge members in closely spaced relation to the inner wall of the outer cartridge member to prevent collapsing of the last mentioned inner wall by inward liquid pressure on the filtering medium in the outer cartridge member when said filtering medium becomes less than normally porous, said housing also being provided with a liquid outlet communicating with the interior of said inner cartridge member and with another liquid outlet communicating with the interior of said support member.

8. The device as defined in claim 7 wherein said inner and outer cartridge members are separate entities, said support member extending through and projecting axially from the concentric space between said inner and outer cartridge members at both ends of the cartridge means, and means for mounting both projecting ends of said support member in said housing.

9. The device as defined in claim 7 wherein said cartridge means also includes means for bridging the concentric space between said inner and outer cartridge members and securing the same together at one end only of the cartridge means, said support member projecting axially from said concentric space at the other end of the cartridge means, and means for mounting the projecting end only of said support member in said housing.

10. The device as defined in claim 7 wherein said support member is permanently fixed in said housing.

11. The device as defined in claim 7 wherein said support member is removably positioned in said housing.

12. For use in a liquid filter having a housing having a base, and an apertured hollow center post carried by the base extending axially through the housing and having a liquid outlet communicating with the exterior of the housing and a replaceable filter cartridge with foraminous concentric walls subjected to relatively high and relatively low liquid pressures respectively and with a porous filtering medium between said walls: a foraminous substantially tubular support member adapted to be mounted in the filter housing as a component thereof independent of the cartridge externally of the apertured post and adapted to be disposed in closely spaced concentric relation to the cartridge wall subjected to relatively low liquid pressure, whereby to prevent collapsing of the last mentioned wall by relatively high liquid pressure on the filtering medium between the walls when the filtering medium becomes less than normally porous.

13. In a liquid filter, the combination of a housing, including a base, a replaceable cartridge removably positioned in said housing, said cartridge including foraminous inner and outer walls and a porous filtering medium therebetween, said base having an inlet for delivering pressurized liquid to the outer foraminous wall of said cartridge, a center post extending axially through the housing and carried thereby, and a foraminous substantially tubular support member provided in the housing as a component thereof independent of said cartridge, said support member extending centrally in said cartridge externally of the center post and in closely spaced relation to the inner cartridge wall to prevent collapsing of the latter by inward liquid pressure on said filtering medium when the filtering medium becomes less than normally porous, said base also being provided with a liquid outlet in communication with the interior of said support member, and offset laterally with reference to the center post.

14. The device as defined in claim 13 wherein said support member is permanently fixed in said housing.

15. The device as defined in claim 13 wherein said support member is removably positioned in said housing.

16. The device as defined in claim 13 wherein said support member is mounted by both ends thereof in said housing.

17. The device as defined in claim 13 wherein said support member is mounted by only one end thereof in said housing.

18. A device as defined in claim 13 wherein the re-removable cartridge is spring biased against the end of the housing opposite the base.

References Cited

UNITED STATES PATENTS

| | | | |
|---|---|---|---|
| 2,468,862 | 5/1949 | Briggs | 210—457 |
| 2,823,804 | 2/1958 | Myring | 210—442 X |
| 2,864,505 | 12/1958 | Kasten | 210—315 |
| 2,929,506 | 3/1960 | Belgarde | 210—315 |
| 2,936,893 | 5/1960 | Arkoosh et al. | 210—315 X |
| 647,682 | 4/1900 | Reed | 210—453 X |
| 1,992,581 | 2/1935 | Reeder | 210—453 X |
| 2,253,686 | 8/1941 | Burckhalter | 210—315 X |
| 2,904,186 | 9/1959 | Moore | 210—437 |
| 3,167,507 | 1/1965 | Berhans et al. | 210—315 X |
| 3,243,045 | 3/1966 | Tietz | 210—443 X |
| 3,272,342 | 9/1966 | McLaren et al. | 210—440 |
| 3,283,902 | 11/1966 | Farris et al. | 210—132 X |

FOREIGN PATENTS

| | | |
|---|---|---|
| 481,898 | 6/1953 | Italy. |
| 1,001,972 | 2/1957 | Germany. |
| 16,906 | 10/1898 | Switzerland. |

SAMIH N. ZAHARNA, *Primary Examiner.*

REUBEN FRIEDMAN, *Examiner.*

F. SPEAR, *Assistant Examiner.*